(12) United States Patent
Ghose et al.

(10) Patent No.: US 12,444,037 B2
(45) Date of Patent: Oct. 14, 2025

(54) CREATING SYNTHETIC DATA FOR COMPOSITE INSPECTION

(71) Applicant: The Boeing Company, Arlington, VA (US)

(72) Inventors: Sayata Ghose, Sammamish, WA (US); Troy Winfree, Seattle, WA (US); Tyler Holmes, Seattle, WA (US); Brandon Poe, Lynnwood, WA (US); Kristin L. Shaffer, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 153 days.

(21) Appl. No.: 18/309,640

(22) Filed: Apr. 28, 2023

(65) Prior Publication Data

US 2024/0362764 A1   Oct. 31, 2024

(51) Int. Cl.
| | | |
|---|---|---|
| *G06T 19/20* | (2011.01) | |
| *G06T 7/00* | (2017.01) | |
| *G06T 15/20* | (2011.01) | |
| *G06T 17/00* | (2006.01) | |

(52) U.S. Cl.
CPC ............ *G06T 7/0004* (2013.01); *G06T 15/20* (2013.01); *G06T 17/00* (2013.01); *G06T 2207/10024* (2013.01); *G06T 2207/10048* (2013.01); *G06T 2207/20081* (2013.01); *G06T 2207/30164* (2013.01)

(58) Field of Classification Search
CPC ....... G06T 7/0004; G06T 15/20; G06T 17/00; G06T 2207/10024; G06T 2207/10048; G06T 2207/20081; G06T 2207/30164; G06T 2219/2012; G06T 19/20
See application file for complete search history.

(56) References Cited

U.S. PATENT DOCUMENTS

| | | | | |
|---|---|---|---|---|
| 10,761,067 | B2 * | 9/2020 | Jack | G01N 29/4472 |
| 11,062,525 | B1 * | 7/2021 | Manser | G06T 19/006 |
| 2019/0026958 | A1 * | 1/2019 | Gausebeck | G06T 7/579 |
| 2019/0318444 | A1 * | 10/2019 | Juarez | G06T 7/90 |
| 2020/0327651 | A1 * | 10/2020 | Srivastava | G06T 7/0004 |

(Continued)

OTHER PUBLICATIONS

Zambal et al., "End-to-End Defect Detection in Automated Fiber Placement Based on Artificially Generated Data," Fourteenth International Conference on Quality Control by Artificial Vision, May 15-17, 2019, 2019, Mulhouse, France, published by arXiv Oct. 11, 2019, 8 pages. https://arxiv.org/pdf/1910.04997.pdf.

(Continued)

*Primary Examiner* — Xiao M Wu
*Assistant Examiner* — George Renze
(74) *Attorney, Agent, or Firm* — Yee & Associates, P.C.

(57) ABSTRACT

A method of generating synthetic data for composite manufacturing inspection comprising creating a three-dimensional model of a composite layup; generating an inconsistency in the three-dimensional model of the composite layup; setting a camera position and a camera orientation in the three-dimensional model space; generating a captured image of the three-dimensional model and the inconsistency from the camera position and the camera orientation; and creating a secondary image from the captured image, the secondary image having colorations of a preselected inspection type.

22 Claims, 10 Drawing Sheets

(56) References Cited

U.S. PATENT DOCUMENTS

| | | | | |
|---|---|---|---|---|
| 2021/0201474 A1* | 7/2021 | Sharma | ............ | G06T 7/579 |
| 2022/0398693 A1* | 12/2022 | Sasagawa | ............ | G06T 5/00 |
| 2023/0174250 A1* | 6/2023 | Stone | ............ | G06V 10/60 |
| | | | | 382/141 |

OTHER PUBLICATIONS

Chen, et al., "A Digital Twin for Automated Layup of Prepreg Composite Sheets," Journal of Manufacturing Science and Engineering Sep. 27, 2021, 12 pages, accessed Aug. 15, 2024, https://doi.org/10.1115/1.4052132.

Extended European Search Report, dated Jul. 31, 2024, regarding EP Application No. 24162662.1, 8 pages.

Manyar, et al., "Synthetic Image Assisted Deep Learning Framework for Detecting Defects During Composite Sheet Layup," Aug. 14, 2022, 15 pages, University of Southern California, Los Angeles, CA, accessed Aug. 15, 2024, https://www.researchgate.net/profile/Omey-Manyar/publication/360722986.

Meister, et al., "Synthetic Image Data Augmentation for Fibre Layup Inspection Processes: Techniques to Enhance the Data Set," Feb. 2, 2021, 23 pages, Journal of Intelligent Manufacturing (2021) 32:1767-1789, accessed Aug. 15, 2024, https://doi.org/10.1007/s10845-021-01738-7.

* cited by examiner

CREATING SYNTHETIC DATA FOR COMPOSITE INSPECTION

BACKGROUND INFORMATION

1. Field

The present disclosure relates generally to inspection and more specifically to data training sets for inconsistency identification.

2. Background

To identify inconsistencies in manufacturing, data sets are built to train classification models. The quality of a classification model is dependent on the quantity of inconsistency data. Therefore, it would be desirable to have a method and apparatus that takes into account at least some of the issue discussed above, as well as other possible issues.

SUMMARY

An embodiment of the present disclosure provides a method of generating synthetic data for composite manufacturing inspection. A three-dimensional model of a composite layup is created. An inconsistency is generated in the three-dimensional model of the composite layup. A camera position and a camera orientation is set in the three-dimensional model space. A captured image of the three-dimensional model and the inconsistency is generated from the camera position and the camera orientation. A secondary image is created from the captured image, the secondary image having colorations of a preselected inspection type.

Another embodiment of the present disclosure provides a method of training a composite inspection system. A captured image of a three-dimensional model of a composite layup with an inconsistency is generated at a predetermined camera position and at a predetermined camera orientation within the three-dimensional model space. The captured image is modified to form a secondary image having coloration of a preselected inspection type. The inconsistency identifier program is trained using the secondary image.

Yet another embodiment of the present disclosure provides a method of using synthetically generated training data. An inconsistency is generated in a three-dimensional model comprising a plurality of layers of a composite layup. A captured image of the inconsistency and the three-dimensional model is generated at a predetermined camera position and at a predetermined camera orientation based on a head orientation of an inspection system connected to a composite laying head. A secondary image is generated from the captured image, the secondary image having a coloration of an inspection type of the inspection system. The secondary image is provided as training data for an inconsistency identifier program.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
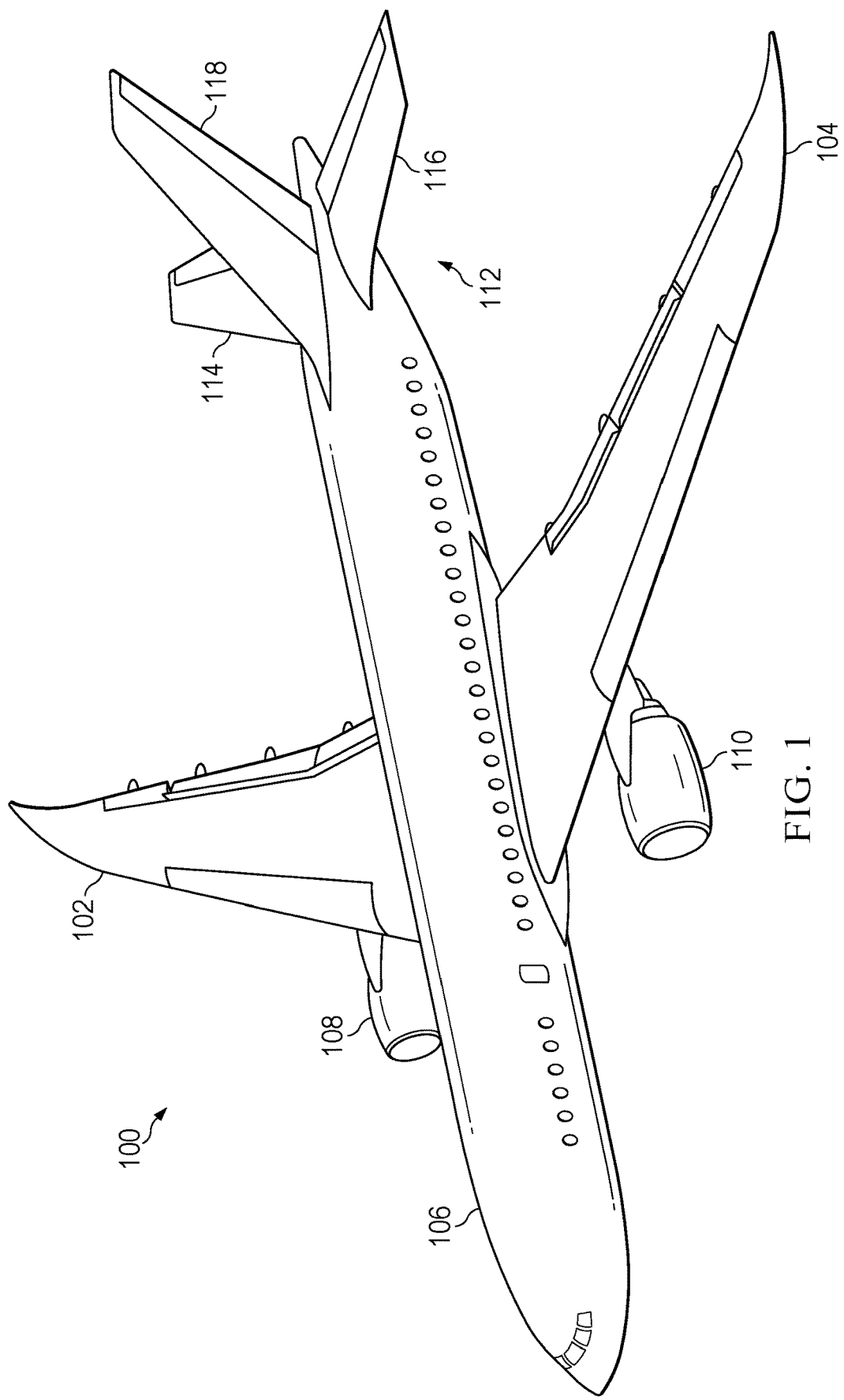
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite inspection models trained by the illustrative examples. Aircraft 100 is an example of an aircraft with composite parts that can be inspected using an inspection system trained on synthetic data.

Figure 2:
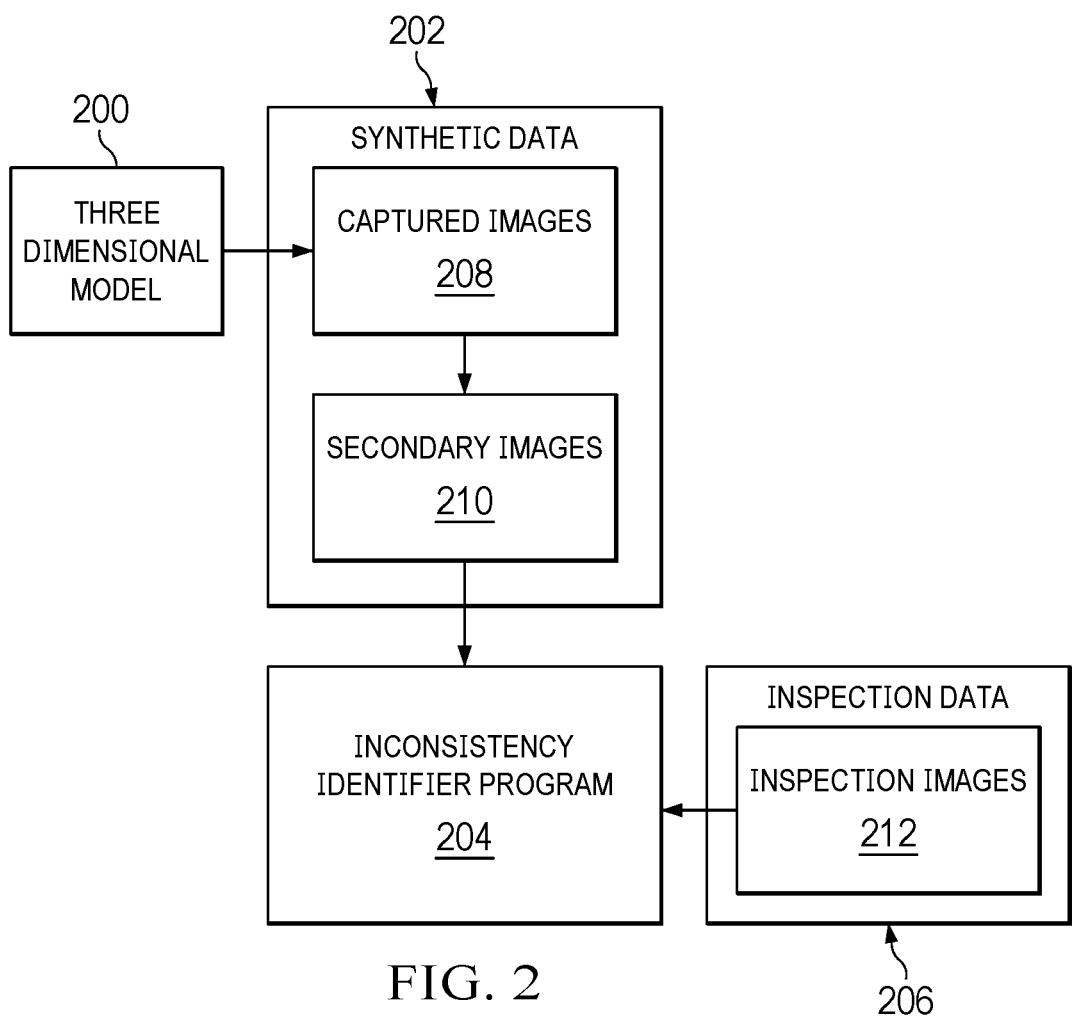
FIG. 2 is an illustration of a block diagram of a data flow in accordance with an illustrative embodiment.

Turning now to FIG. 2, an illustration of a block diagram of a data flow is depicted in accordance with an illustrative embodiment. Three-dimensional model 200 is a model of at least a portion of a part. Three-dimensional model 200 can be a model of at least a portion of at least one of wing 102, wing 104, or body 106 of aircraft 100. Three-dimensional model 200 has any desirable quantity of layers. Three-dimensional model 200 is generated based on a design for a part to be manufactured. In some illustrative examples, three-dimensional model 200 has a same design as a layup for the part. In some illustrative examples, by being based on the layup of the part, the curvature of three-dimensional model 200 is the same as the part to be manufactured.

Three-dimensional model 200 is used to generate synthetic data 202. Synthetic data 202 has sufficient resolution to be used for training inconsistency identifier program 204. By training inconsistency identifier program 204 using synthetic data 202 instead or in addition to using inspection data 206, a greater quantity of training data can be provided to inconsistency identifier program 204. By training inconsistency identifier program 204 using synthetic data 202 instead of or in addition to using inspection data 206, fewer resources can be used. In some illustrative examples, training inconsistency identifier program 204 using synthetic data 202 reduces time. In some illustrative examples, training inconsistency identifier program 204 using synthetic data 202 reduces manufacturing trial and error, thereby reducing manufacturing time. In some illustrative examples, training inconsistency identifier program 204 using synthetic data 202 reduces manufacturing trial and error, thereby reducing material waste.

By training inconsistency identifier program 204 using synthetic data 202 instead of or in addition to using inspection data 206, less waste is generated. For example, if physical inconsistencies were to be intentionally generated for training, this would generate physical waste. As another example, by utilizing synthetic data 202, fewer reworks will be performed, generating less waste. By training inconsistency identifier program 204 using synthetic data 202 instead of or in addition to using inspection data 206, inconsistency identifier program 204 can be trained prior to manufacturing the part. By training inconsistency identifier program 204 using synthetic data 202 instead of or in addition to using inspection data 206, training time can be reduced.

Synthetic data 202 comprises captured images 208 and secondary images 210. Captured images 208 are images taken of three-dimensional model 200 in a computer simulation. Captured images 208 can have any desirable view within three-dimensional model 200.

Captured images 208 generated from three-dimensional model 200 can be used for any desirable inspection type. For example, captured images 208 can be generated for optical inspection, infrared (IR) inspection, laser inspection, or any other desirable type of inspection. To create captured images 208 for a predetermined inspection type, at least one of a camera orientation, a camera position, a field of view, material properties of three-dimensional model 200, colors of three-dimensional model 200, or other aspects of three-dimensional model 200 can be modified based on the predetermined inspection type. In some illustrative examples, at least one of a camera orientation, a camera position, or a field of view can be modified based on a respective inspection system. In some illustrative examples, captured images 208 include a variety of camera orientations, camera positions, and fields of view to cover different inspection system positioning options for a single type of predetermined inspection type.

Secondary images 210 are images generated from captured images 208. In some illustrative examples, captured images 208 are modified to form secondary images 210. In some illustrative examples, filters are applied to captured images 208 to generate secondary images 210. Secondary images 210 can be provided as training data to inconsistency identifier program 204. In some illustrative examples, resolution of captured images 208 is modified to create secondary images 210. In some illustrative examples, coloration of captured images 208 is modified to create secondary images 210. In some illustrative examples, intensity of captured images 208 is modified to create secondary images 210. In some illustrative examples, only selected areas within captured images 208 are modified. In some illustrative examples, portions of captured images 208 are sampled to determine whether modifications are to be performed. This sampling can compare pixel values in captured images 208 to pixel values in inspection images captured during manufacturing. In some illustrative examples, inspection images captured during manufacturing with an inspection system of a desired inspection type are used to define a pixel value profile that is applied to captured images 208 to create secondary images 210. For example, pixel value normalization and min/max rescaling can be performed on captured images 208 to match inspection images gathered during manufacturing. In some illustrative examples, a portion of inspection images 212 can be used to define a pixel value profile.

In some illustrative examples, three-dimensional model 200 is created such that captured images 208 have desired pixel values and desired coloration without additional modifications. In some illustrative examples, material characteristics within three-dimensional model 200 are set to have coloration of a predetermined inspection type. In these illustrative examples, secondary images 210 are optional. In these illustrative examples, captured images 208 can be sent to inconsistency identifier program 204 as training data.

After sufficient synthetic data 202 is generated to train inconsistency identifier program 204, inconsistency identifier program 204 can be used to evaluate inspection images 212. Inspection images 212 are inspection data 206 generated during manufacturing of the part. During inspection, inspection images 212 are evaluated by inconsistency identifier program 204. Inconsistency identifier program 204 locates inconsistencies within inspection images 212. Inconsistency identifier program 204 identifies types of inconsistencies within inspection images 212.

Figure 3:
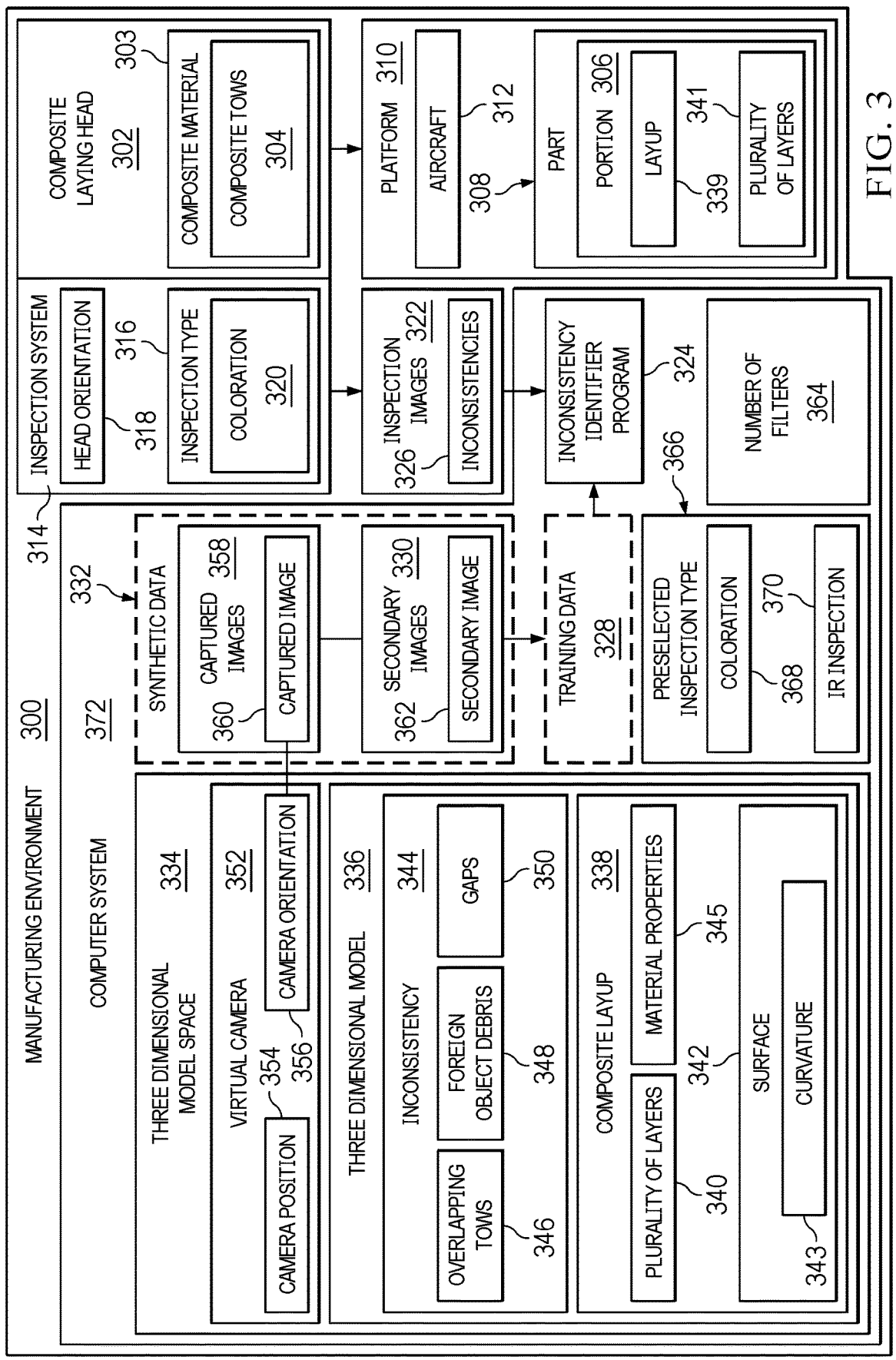
FIG. 3 is an illustration of a block diagram of a manufacturing environment in accordance with an illustrative embodiment.

Turning now to FIG. 3, an illustration of a block diagram of a manufacturing environment is depicted in accordance with an illustrative embodiment. Manufacturing environment 300 is an environment in which portions of aircraft 100 can be manufactured. Three-dimensional model 336 is an example of three-dimensional model 200 of FIG. 2.

Composite laying head 302 lays composite tows 304 to form portion 306 of part 308. Part 308 is a component of platform 310. Platform 310 can take any desirable form, such as a vehicle, building, or vessel. Platform 310 can take the form of a car, a boat, a spaceship, a train, a bus, or any other desirable type of vehicle. In some illustrative examples, platform 310 takes the form of aircraft 312.

Inspection system 314 is mounted to composite laying head 302. Inspection system 314 has inspection type 316 and head orientation 318. Inspection type 316 comprises the technology utilized for inspection system 314. Inspection type 316 can include IR inspection, laser inspection, optical inspection, or any other desirable type of inspection. Inspection type 316 has coloration 320. Coloration 320 includes saturation, intensity, and other values of pixels in inspection type 316.

Inspection system 314 generates inspection images 322 as composite laying head 302 lays composite tows 304. For quality control of platform 310, inspection images 322 are evaluated for the presence of inconsistencies. It is desirable for a machine vision system to identify and classify inconsistencies within inspection images 322. In these illustrative examples, inconsistency identifier program 324 reviews inspection images 322 for inconsistencies 326.

Inconsistency identifier program 324 is an example of a machine vision/machine learning algorithm. Machine vision/machine learning algorithms require a large amount of training images in order to build models. With automated fiber placement (AFP) applications, it is challenging to 'force' situations that would provide the quantity and types of data for training inconsistency identifier program 324 from real world data. Synthetic data 332 is generated to support quality model training.

The illustrative examples recognize and take into account that the training data can be very configuration specific. The illustrative examples recognize and take into account that changes made to the layup 339 of portion 306 of part 308 or layout of part 308 can result in generating a whole new data set.

If training data is only collected from a single orientation, from a single speed, or when the background temperature is a specific value this leaves gaps in the training data that make it difficult to apply the same code in inconsistency identifier program 324 across multiple machines and use cases. Synthetic data 332 can be used to fill those data gaps. In some illustrative examples, synthetic data 332 can be used to train inconsistency identifier program 324 without real world data. In some illustrative examples, synthetic data 332 can be used to train inconsistency identifier program 324 in coordination with real world data images.

Inconsistency identifier program 324 is a classification model trained using training data 328. Training data 328 comprises at least one of captured images 358 or secondary images 330. Captured images 358 and secondary images 330 are synthetic data 332 generated from three-dimensional model space 334.

Three-dimensional model space 334 can be used to create three-dimensional models for generating synthetic data 332. Three-dimensional model space 334 can be any desirable type of three-dimensional modeling software.

Three-dimensional model 336 comprises composite layup 338. Three-dimensional model 336 is a representation of portion 306 of part 308. Composite layup 338 is based on layup 339 of portion 306 of part 308. In some illustrative examples, three-dimensional model 336 of composite layup 338 is generated using layup 339 of portion 306 of part 308. In some illustrative examples, plurality of layers 340 are representative of each of plurality of layers 341 of portion 306 of part 308. In some illustrative examples, layup 339 comprises plurality of layers 341 of composite material 303 and three-dimensional model 336 comprises plurality of layers 340 arranged the same as plurality of layers 341 of composite material 303.

In some illustrative examples, plurality of layers 340 form curvature 343 of surface 342 of composite layup 338. In some illustrative examples, plurality of layers 340 are designed such that curvature 343 is the same as a curvature of portion 306 of part 308. In some illustrative examples, plurality of layers 340 has fewer layers than plurality of layers 341 of portion 306 of part 308.

Three-dimensional model 336 can be modified when a design for part 308 is changed. By modifying three-dimensional model 336, training data 328 can be generated for inconsistency identifier program 324 to take into account changes to the design of part 308.

To form synthetic data 332, inconsistency 344 is generated in three-dimensional model 336 of composite layup 338. Inconsistency 344 takes any desirable form. In some illustrative examples, inconsistency 344 is one of overlapping tows 346, foreign object debris 348, or gaps 350. In some illustrative examples, inconsistency 344 is one of fuzzballs, resin balls, foreign object debris 348, edge folds/twists, heat damage, untacked tows, or missing tows.

Inconsistency 344 can be generated in three-dimensional model 336 dependent on a type of inconsistency 344. For example, when inconsistency 344 is a fuzzball, inconsistency 344 can be constructed in three-dimensional model 336 as a plurality of randomly oriented lines of varying lengths passing through a reference center point.

When inconsistency 344 is an edge fold, inconsistency 344 can be constructed in three-dimensional model 336 by identifying a distance along an outer tow edge and solving the optimization problem:

$$\min \|\Delta x\|^2, \quad \sum \|x_i - x_{i+1}\| = d$$

where x is a list of points that form a curve along the outer tow edge, d is the required arc-length for the edge and $\Delta$ is the umbrella Laplacian for the points which averages neighbors of points of x.

When inconsistency 344 is a twist, inconsistency 344 can be constructed in three-dimensional model 336 by removing a portion of a tow over some distance and building new geometry by connecting the lower tow boundary to the upper tow boundary and visa-versa. When inconsistency 344 is an untacked tow, inconsistency 344 can be constructed in three-dimensional model 336 by identifying a distance along a tow at the tow start or end and lifting the tow off the three-dimensional part surface along a quadratic curve while maintaining tow length.

When inconsistency 344 is one of overlapping tows 346 or gaps 350, inconsistency 344 can be constructed in three-dimensional model 336 by identifying a portion of a tow over some distance and shifting the tow centerline up or down by some amount. When inconsistency 344 is a missing tow, inconsistency 344 can be constructed in three-dimensional model 336 by identifying a tow in the three-dimensional model 336 and removing it from the simulated geometry.

Virtual camera 352 is a representation of a field of view within three-dimensional model space 334. Virtual camera 352 has camera position 354 and camera orientation 356 in three-dimensional model space 334. Camera position 354 can be modified based on at least one of inspection type 316 or a mounting position of inspection system 314 to composite laying head 302. Camera position 354 can be modified to change an amount of three-dimensional model 336 visible in captured images 358. Camera position 354 can be modified to change a section of three-dimensional model 336 visible in captured images 358.

In some illustrative examples, head orientation 318 of inspection system 314 attached to composite laying head 302 in manufacturing environment 300 is determined and camera position 354 and camera orientation 356 are set in three-dimensional model space 334 by setting camera orientation 356 based on head orientation 318.

Captured image 360 of three-dimensional model 336 and inconsistency 344 is generated from camera position 354 and camera orientation 356. Captured image 360 is one of captured images 358. In some illustrative examples, captured images 358 are taken from more than one camera position 354. In some illustrative examples, captured images 358 are taken from more than one camera orientation 356. Captured images 358 have sufficient resolution to be used as training data 328 for inconsistency identifier program 324.

In some illustrative examples, composite layup 338 is formed with material properties 345 such that captured images 358 can be used as training data 328. In these illustrative examples, material properties 345 cause captured images 358 to have desired coloration, intensity, and other properties for preselected inspection type 366, such as inspection type 316.

In other illustrative examples, processing is performed on captured images 358 to form secondary images 330. In these illustrative examples, secondary images 330 are used as training data 328. In some illustrative examples, secondary image 362 is created from captured image 360, secondary image 362 having colorations of preselected inspection type 366. In some illustrative examples, captured image 360 can be processed to form secondary images 330 for a plurality of different inspection types.

In some illustrative examples, number of filters 364 is applied to captured image 360 to create secondary image 362. Applying number of filters 364 to captured image 360 creates secondary image 362 that has characteristics of images of preselected inspection type 366.

In some illustrative examples, applying number of filters 364 to captured image 360 creates coloration 368 of preselected inspection type 366 to captured image 360 to create secondary image 362. In some illustrative examples, applying number of filters 364 to captured image 360 creates coloration 368 of an IR image.

In some illustrative examples, applying number of filters 364 to captured image 360 creates coloration 368 characteristic of the inconsistency type for preselected inspection type 366 within pixels of secondary image 362 with inconsistency 344. For example, when inconsistency 344 is foreign object debris 348, applying number of filters 364 to captured image 360 creates coloration 368 characteristic of foreign object debris 348 for preselected inspection type 366 within pixels of secondary image 362 with inconsistency 344. As a specific example, when inconsistency 344 is foreign object debris 348 and preselected inspection type 366 is IR inspection 370, applying number of filters 364 to captured image 360 creates coloration 368 characteristic of foreign object debris 348 for IR inspection 370 within pixels of secondary image 362 with inconsistency 344.

In some illustrative examples, creating secondary image 362 comprises sampling colors from pixels of inconsistency 344 in captured image 360 and adjusting color values for the pixels to values within a range for an inconsistency type of inconsistency 344 in stock images of preselected inspection type 366. After training inconsistency identifier program 324, inconsistency identifier program 324 can be used to evaluate inspection images 322 of composite tows 304 after composite tows 304 are laid.

As depicted, computer system 372 includes three-dimensional model space 334 and inconsistency identifier program 324. In other illustrative examples, three-dimensional model space 334 and inconsistency identifier program 324 are present on separate computer systems in communication with each other.

Generating training data 328 from three-dimensional model space 334 reduces at least one of training time, cost, and operator time. Three-dimensional model 336 can be used to generate training data 328 for multiple inspection types. Three-dimensional model 336 can be used to generate training data 328 for multiple travel speeds. Three-dimensional model 336 can be used to generate training data 328 for multiple different camera orientations.

Synthetic data 332 can also provide thermal information when preselected inspection type 366 is IR inspection 370. When synthetic data 332 does not include thermal information such as coloration 368, models, such as inconsistency identifier program 324, only rely on contrast differences to pick out inconsistencies. When thermal data, such as coloration 368, is present in synthetic data 332, shifts in overall temperature or the camera being used in an auto-gain mode can be accommodated.

The addition of thermal information adds context to synthetic data 332 provided to machine learning algorithms, such as inconsistency identifier program 324. Including thermal information allows for training of inconsistency identifier program 324 that considers overall environmental temperatures when looking at contrast differences as well as tracking gradual temperature changes that would not be apparent in a simple contrast only image.

Three-dimensional model space 334 allows for detailed simulated data sets to be generated. In some illustrative examples, the synthetic data can be generated using three-dimensional model space 334 prior to the first build of a physical component in manufacturing environment 300. Three-dimensional model space 334 can include the material system, machine configuration, part configuration, layup plan, heater plan, camera information, camera field of view, and other desirable parameters to allow for very detailed simulated data sets.

The illustration of manufacturing environment 300 in FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, secondary images 330 can be optional. In some illustrative examples, material characteristics of plurality of layers 340 are set such that captured images 358 can be used as training data 328. In these illustrative examples, filtering or other modifications to produce secondary images 330 is not performed.

Figure 4:
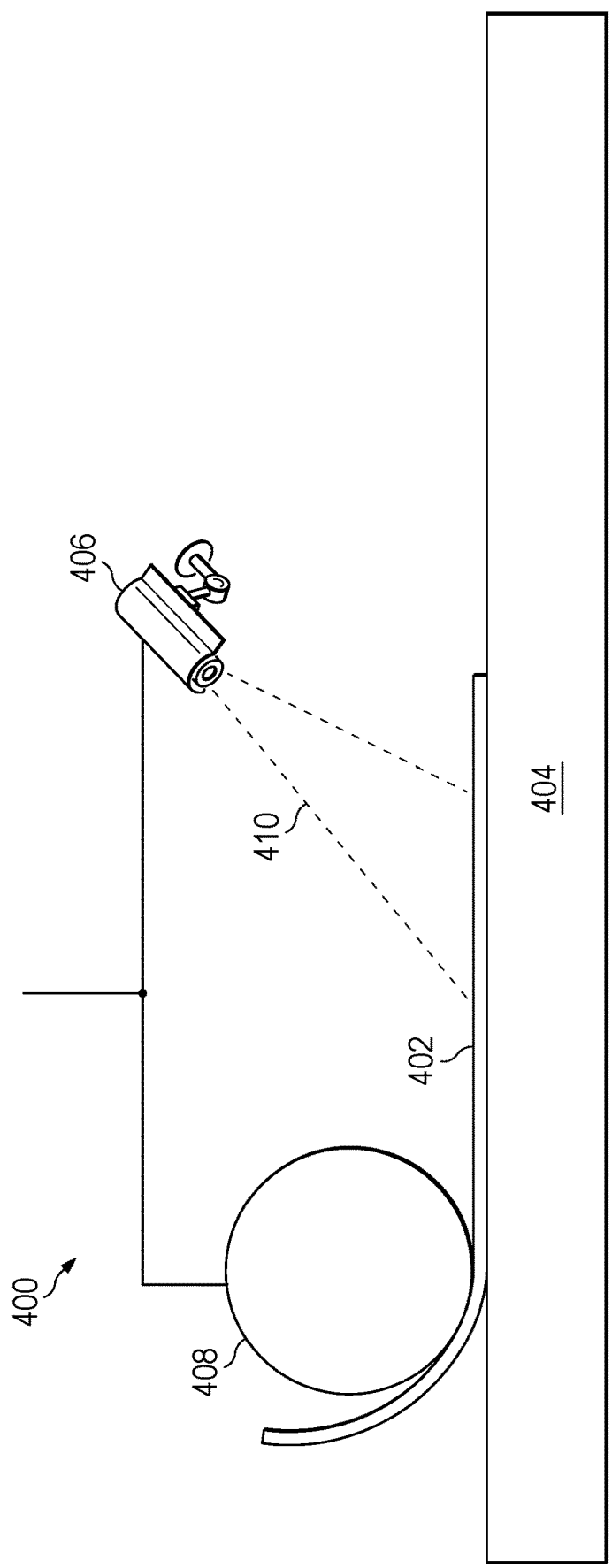
FIG. 4 is an illustration of a side view of laying down and inspecting composite material in accordance with an illustrative embodiment.

Turning now to FIG. 4, an illustration of a side view of laying down and inspecting composite material is depicted in accordance with an illustrative embodiment. View 400 is a view of laying down composite material 402 on substrate 404. In some illustrative examples, composite material 402 takes the form of composite tows. Inspection system 406 is mounted to composite laying head 408. As composite laying head 408 lays composite material 402, inspection system 406 generates inspection images of composite material 402. Field of view 410 of inspection system 406 is affected by an inspection type of inspection system 406, a head orientation of inspection system 406, and a mounting position relative to composite laying head 408.

Inspection images generated by inspection system 406 are examples of images that can be inspected by inconsistency identifier program 324 of FIG. 3. Inspection system 406 is an example of a physical implementation of inspection system 314 of FIG. 3.

Figure 5:
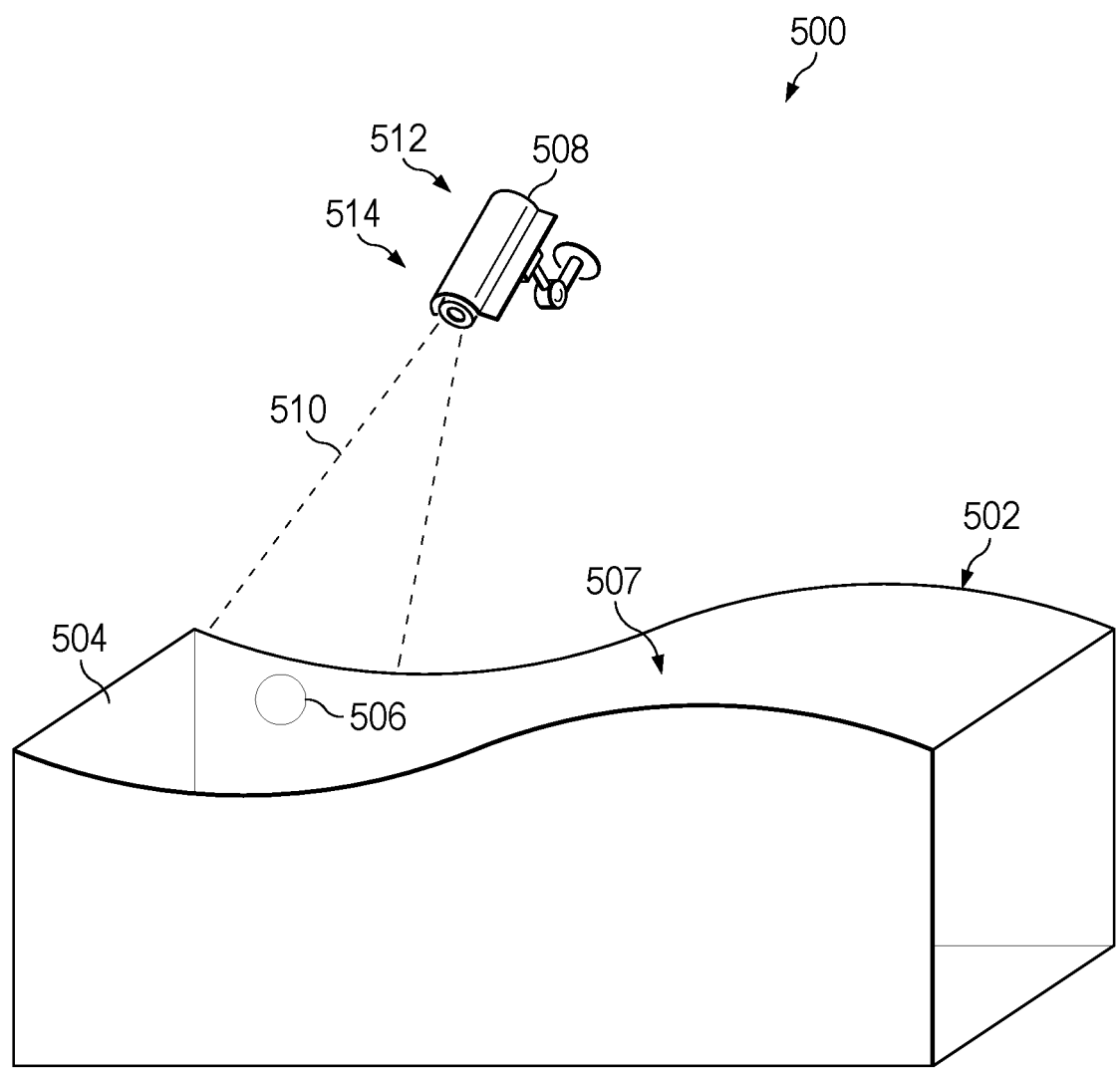
FIG. 5 is an illustration of a representation of a three-dimensional model in accordance with an illustrative embodiment.

Turning now to FIG. 5, an illustration of a representation of a three-dimensional model is depicted in accordance with an illustrative embodiment. Three-dimensional model space 500 is a representation of three-dimensional model space 334 of FIG. 3. Three-dimensional model 502 of composite layup 504 is present in three-dimensional model space 500. Inconsistency 506 is present on surface 507 of three-dimensional model 502.

Camera 508 is representation of a viewpoint within three-dimensional model space 500. Field of view 510 of camera 508 is depicted. Camera 508 has camera position 512 and camera orientation 514 within three-dimensional model space 500. As depicted, there are 6 dimensions for camera position and orientation. There are 3 dimensions for camera position 512: x, y, and z coordinates. There are 3 dimensions for camera orientation 514 (pitch, roll, yaw).

Synthetic data for different parts can be created by modifying three-dimensional model 502 or create a different three-dimensional model. Synthetic data for different types of inconsistencies can be created by modifying inconsistency 506. Synthetic data for different types of inspection systems can be created by modifying at least one of camera position 512, camera orientation 514, and material properties of three-dimensional model 502. Thus, three-dimensional model space 500 can be used to generate synthetic data for any part, any desirable type of inspection system, and any desirable position of the inspection system.

Figure 6A:
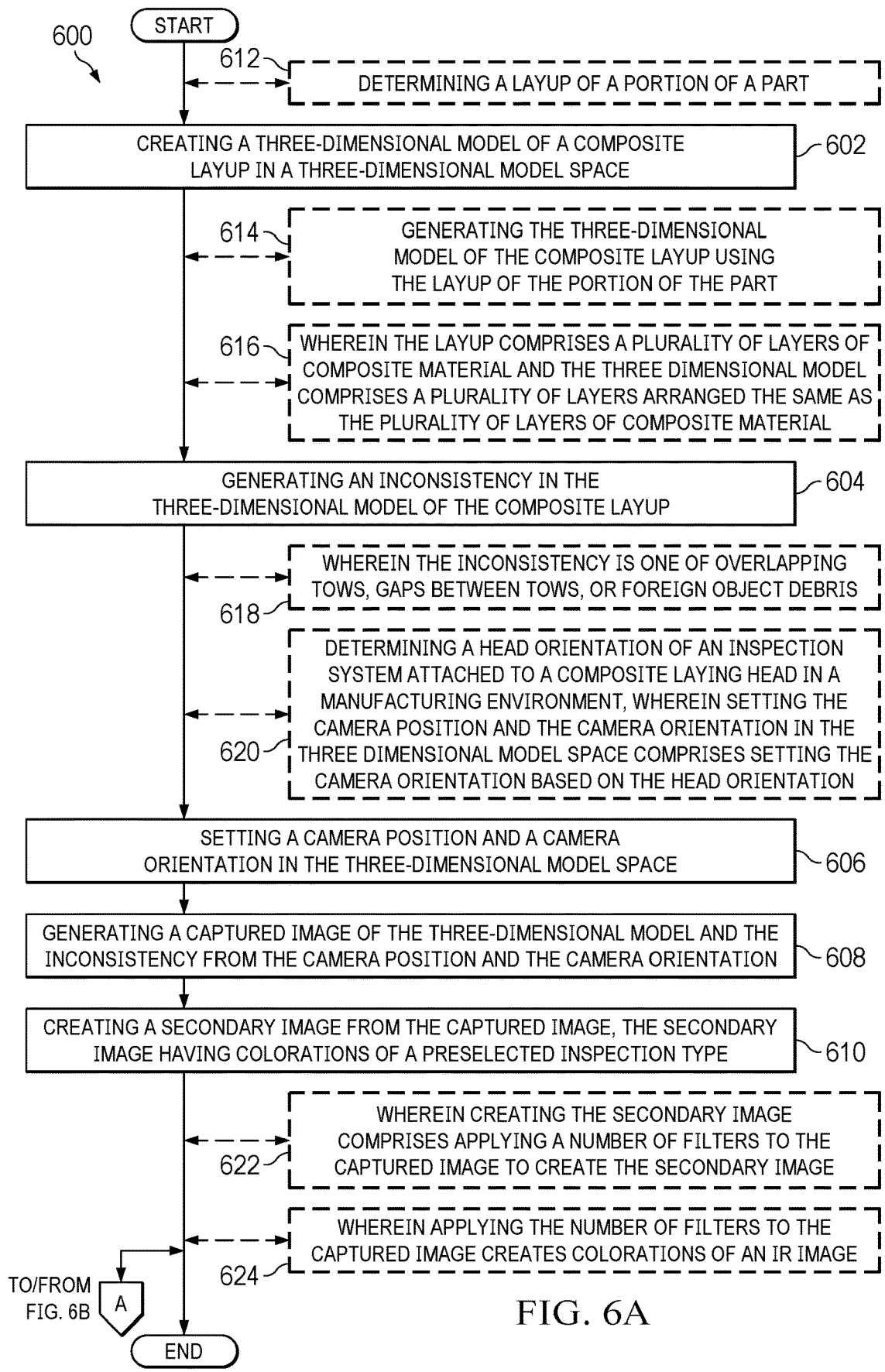
FIGS. 6A and 6B are flowcharts of a method of generating synthetic data for composite manufacturing inspection in accordance with an illustrative embodiment.
Figure 6B:
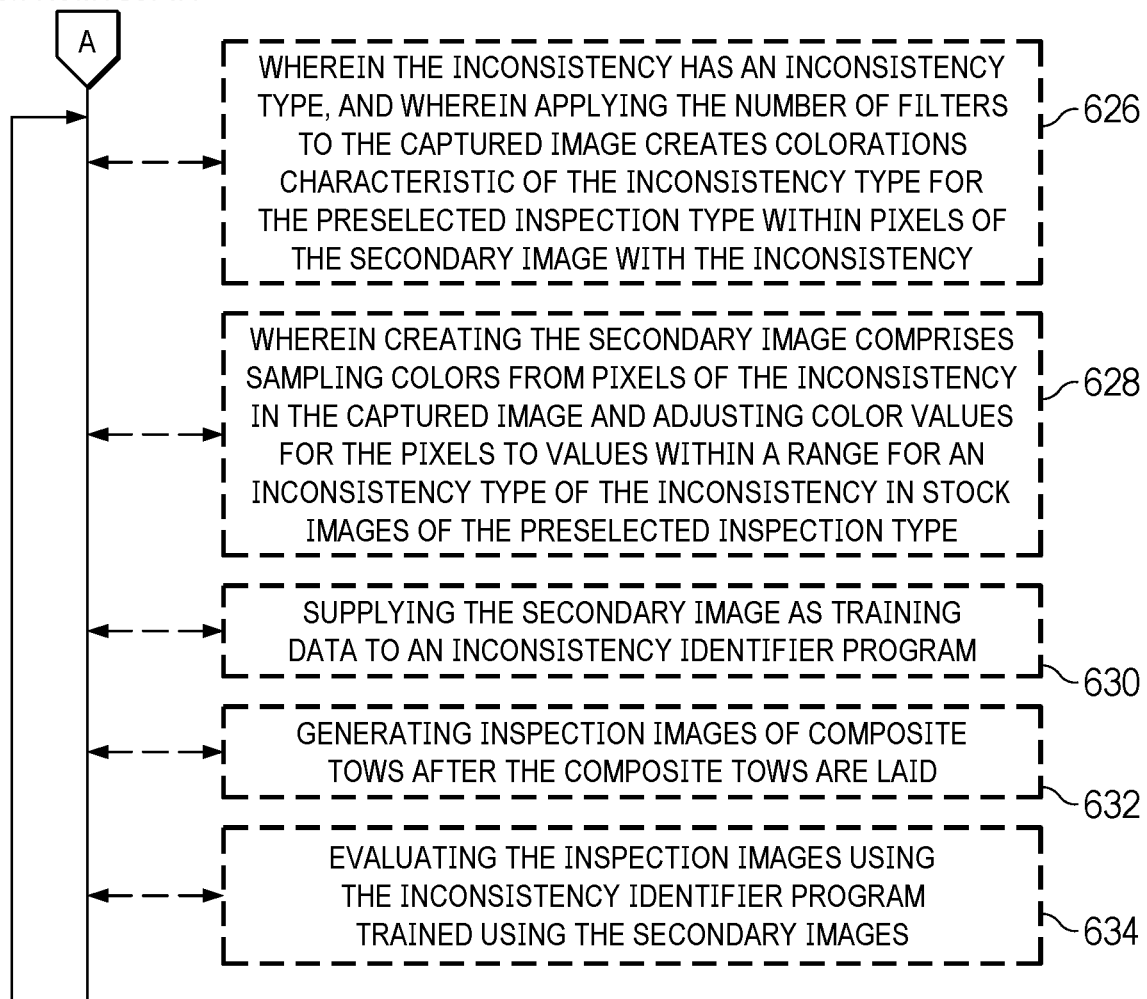

Turning now to FIGS. 6A and 6B, a flowchart of a method of generating synthetic data for composite manufacturing inspection is depicted in accordance with an illustrative embodiment. Method 600 can be used to generate synthetic data 202 to train inconsistency identifier program 204 of FIG. 2. Method 600 can be used to generate synthetic data to train inconsistency identifier program 324 of FIG. 3. Method 600 can be used to generate synthetic data that can be used to train an inconsistency identifier program for analyzing inspection data from inspection system 406 of FIG. 4. Method 600 can be implemented in three-dimensional model space 500.

Method 600 creates a three-dimensional model of a composite layup in a three-dimensional model space (operation 602). The three-dimensional model has material characteristics that can be modified as desired.

Method 600 generates an inconsistency in the three-dimensional model of the composite layup (operation 604). The inconsistency can have any desirable form. In some illustrative examples, the inconsistency is on the surface of the three-dimensional model. In some illustrative examples, the inconsistency is below the surface and within the layers of the three-dimensional model.

Method 600 sets a camera position and a camera orientation in the three-dimensional model space (operation 606). Method 600 generates a captured image of the three-dimensional model and the inconsistency from the camera position and the camera orientation (operation 608). Method 600 creates a secondary image from the captured image, the secondary image having colorations of a preselected inspection type (operation 610). The preselected inspection type is an inspection type for which the secondary image will be used to train an inconsistency identifier program. In some illustrative examples, the preselected inspection type can be one of IR inspection, laser inspection, optical inspection, or another desirable form of inspection. Afterwards, method 600 terminates.

In some illustrative examples, method 600 determines a layup of a portion of a part (operation 612). The portion of the part can be any desirable section of the part. The part can be any desirable component. Layup information includes an order of composite layers, type of composite material, width of composite material, shape of each layer of composite, and other variables for laying down the composite material to form the portion of the part. In some illustrative examples, method 600 generates the three-dimensional model of the composite layup using the layup of the portion of the part (operation 614). In these illustrative examples, the three-dimensional model will resemble the portion of the part. In some illustrative examples, the layup comprises a plurality of layers of composite material and the three-dimensional model comprises a plurality of layers arranged the same as the plurality of layers of composite material (operation 616).

In some illustrative examples, the inconsistency is one of overlapping tows, gaps between tows, or foreign object debris (operation 618). In some illustrative examples, the inconsistency is one of fuzzballs, resin balls, foreign object debris, edge folds/twists, heat damage, untacked tows, or missing tows.

In some illustrative examples, method 600 determines a head orientation of an inspection system attached to a composite laying head in a manufacturing environment, wherein setting the camera position and the camera orientation in the three-dimensional model space comprises setting the camera orientation based on the head orientation (operation 620). In these illustrative examples, the captured image has a field of view substantially similar to the field of view of images captured by the inspection system attached to the composite laying head.

In some illustrative examples, creating the secondary image comprises applying a number of filters to the captured image to create the secondary image (operation 622). In some illustrative examples, applying the number of filters to the captured image creates colorations of an IR image (operation 624).

In some illustrative examples, the inconsistency has an inconsistency type, and wherein applying the number of filters to the captured image creates colorations characteristic of the inconsistency type for the preselected inspection type within pixels of the secondary image with the inconsistency (operation 626). In some illustrative examples, for a preselected inspection type, each inconsistency type can have associated colors identified from previous real world collected data. For example, fuzzballs in an IR image may have associated colors for pixels within the inconsistencies. As another example, missing tows in an IR image may have their own respective associated colors for pixels within the inconsistencies.

In some illustrative examples, applying the filters to the captured image will change the pixels in the inconsistency in the captured image such that the pixels have colors associated with the inconsistency type. In some illustrative examples, applying the filters to the captured image generate a secondary image with an inconsistency having colors associated with the inconsistency type for the preselected inspection type.

In some illustrative examples, creating the secondary image comprises sampling colors from pixels of the inconsistency in the captured image and adjusting color values for the pixels to values within a range for an inconsistency type of the inconsistency in stock images of the preselected inspection type (operation 628). In some illustrative examples, for a preselected inspection type, each inconsistency type can have a range of pixel values identified from previous real world collected data. For example, fuzzballs in an IR image may have a range of values for pixels within the inconsistencies. As another example, missing tows may have a range of values for pixels within the inconsistencies. In some illustrative examples, creating the secondary image comprises adjusting the values of the pixels in a missing tow in the captured image to have values within the range of values for pixels sampled in the real world collected data.

In some illustrative examples, method 600 supplies the secondary image as training data to an inconsistency identifier program (operation 630). In some illustrative examples, method 600 generates inspection images of composite tows after the composite tows are laid (operation 632). In some illustrative examples, method 600 evaluates the inspection images using the inconsistency identifier program trained using the secondary images (operation 634).

Figure 7:
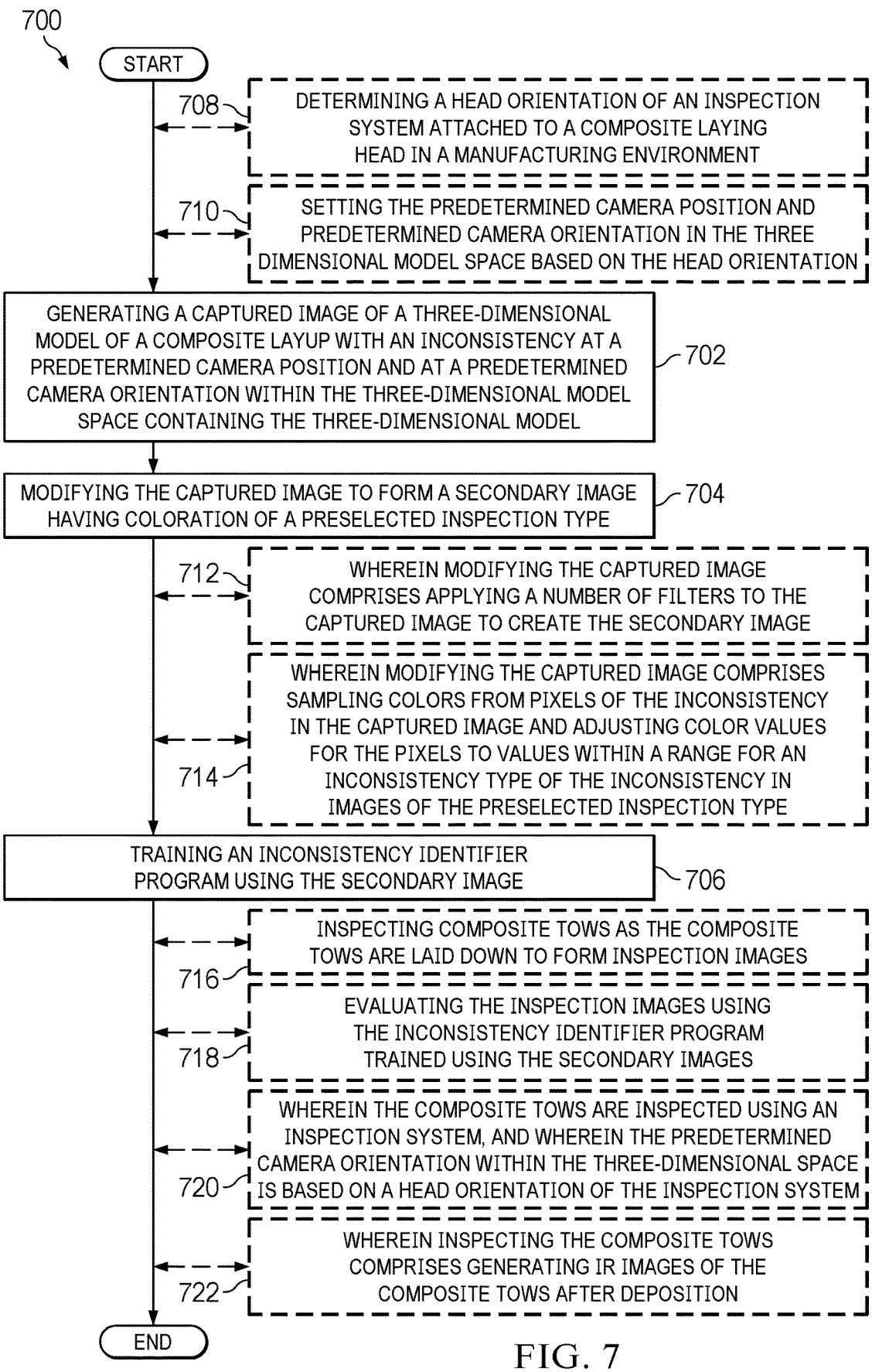
FIG. 7 is a flowchart of a method of training a composite inspection system in accordance with an illustrative embodiment.

Turning now to FIG. 7, a flowchart of a method of training a composite inspection system is depicted in accordance with an illustrative embodiment. Method 700 can be used to generate synthetic data 202 to train inconsistency identifier program 204 of FIG. 2. Method 700 can be used to generate synthetic data to train inconsistency identifier program 324 of FIG. 3. Method 700 can be used to generate synthetic data that can be used to train an inconsistency identifier program for analyzing inspection data from inspection system 406 of FIG. 4. Method 700 can be implemented in three-dimensional model space 500 of FIG. 5.

Method 700 generates a captured image of a three-dimensional model of a composite layup with an inconsistency at a predetermined camera position and at a predetermined camera orientation within the three-dimensional model space containing the three-dimensional model (operation 702). Method 700 modifies the captured image to form a secondary image having coloration of a preselected inspection type (operation 704). Method 700 trains an inconsistency identifier program using the secondary image (operation 706). Afterwards, method 700 terminates.

Although operations 702 through 706 discuss a single captured image and secondary image, in some illustrative examples, a plurality of synthetic images can be used to train the inconsistency identifier program. In some illustrative examples, operations 702 through 706 are performed iteratively prior to using the inconsistency identifier program to evaluate inspection images from manufacturing.

In some illustrative examples, modifying the captured image comprises applying a number of filters to the captured image to create the secondary image (operation 712). In some of these illustrative examples, the number of filters are applied to provide characteristics of the inspection type to the secondary image.

In some illustrative examples, modifying the captured image comprises sampling colors from pixels of the inconsistency in the captured image and adjusting color values for the pixels to values within a range for an inconsistency type of the inconsistency in stock images of the preselected inspection type (operation 714). In these illustrative examples, real world data in the form of stock images provides information for modifying the captured synthetic images.

In some illustrative examples, method 700 inspects composite tows as the composite tows are laid down to form inspection images (operation 716). In some illustrative examples, method 700 evaluates the inspection images using the inconsistency identifier program trained using the secondary images (operation 718).

In some illustrative examples, the composite tows are inspected using an inspection system, and wherein the predetermined camera orientation within the three-dimensional model space is based on a head orientation of the inspection system (operation 720). The three-dimensional model can be imaged from a plurality of different predetermined camera orientations for inspection systems at different head orientations and/or different inspection types.

In some illustrative examples, inspecting the composite tows comprises generating IR images of the composite tows after deposition (operation 722). Applying the composite tows comprises heating the composite tows prior to laying the composite tows on a substrate. The IR images provide information regarding heat distribution in the composite tows after being laid on the substrate. The substrate can take the form of prior layers of composite tows.

In some illustrative examples, method 700 determines a head orientation of an inspection system attached to a composite laying head in a manufacturing environment (operation 708). In some illustrative examples, method 700 sets the predetermined camera position and the predetermined camera orientation in the three-dimensional model space based on the head orientation (operation 710).

Figure 8:
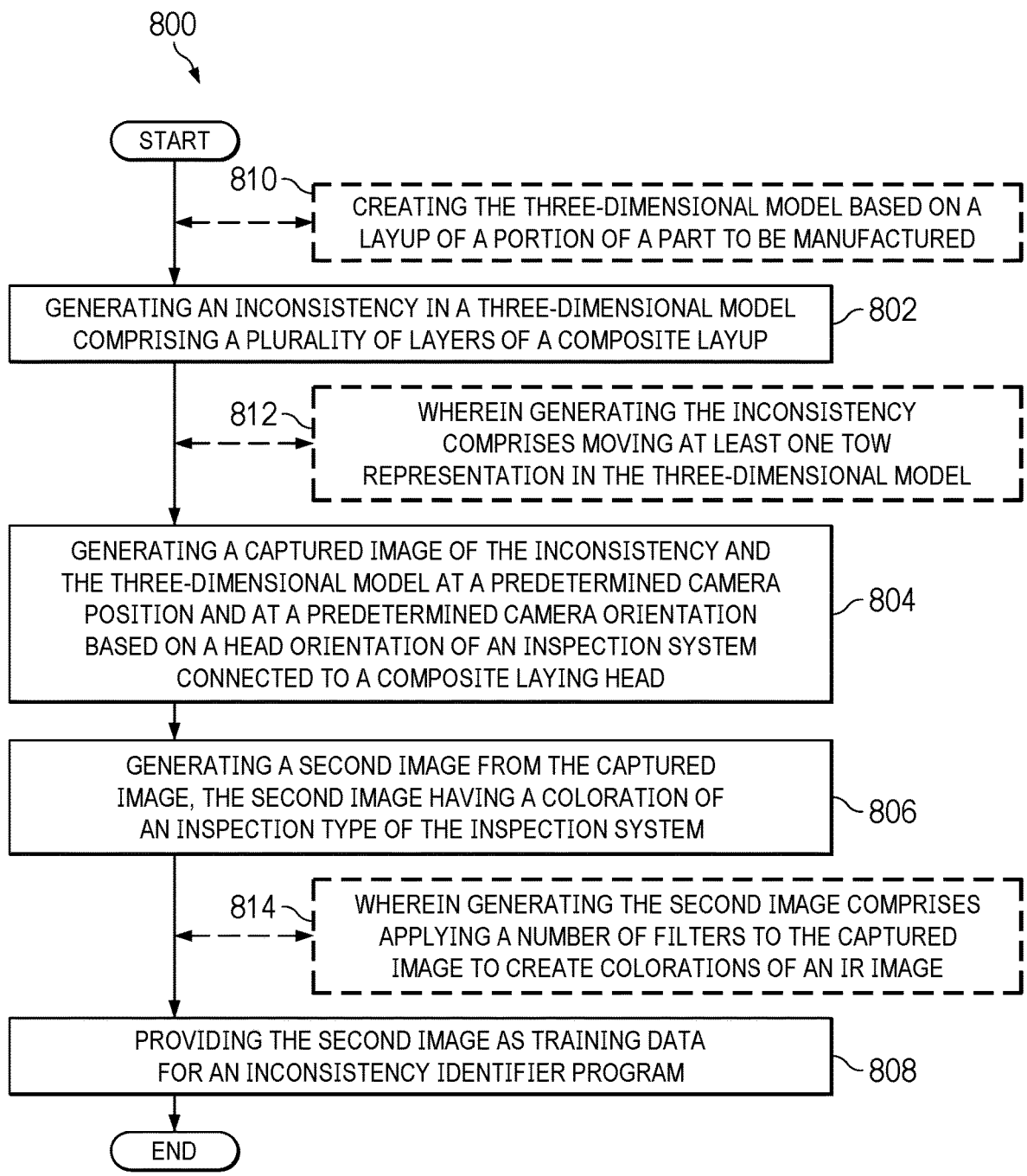
FIG. 8 is a flowchart of a method of using synthetically generated training data in accordance with an illustrative embodiment.

Turning now to FIG. 8, a flowchart of a method of using synthetically generated training data is depicted in accordance with an illustrative embodiment. Method 800 can be used to generate synthetic data 202 to train inconsistency identifier program 204 of FIG. 2. Method 800 can be used to generate synthetic data to train inconsistency identifier program 324 of FIG. 3. Method 800 can be used to generate synthetic data that can be used to train an inconsistency identifier program for analyzing inspection data from inspection system 406 of FIG. 4. Method 800 can be implemented in three-dimensional model space 500 of FIG. 5.

Method 800 generates an inconsistency in a three-dimensional model comprising a plurality of layers of a composite layup (operation 802). The inconsistency can have any desirable form. In some illustrative examples, the inconsistency is on the surface of the three-dimensional model. In some illustrative examples, the inconsistency is below the surface and within the layers of the three-dimensional model.

Method 800 generates a captured image of the inconsistency and the three-dimensional model at a predetermined camera position and at a predetermined camera orientation based on a head orientation of an inspection system connected to a composite laying head (operation 804). By generating the captured image at the predetermined camera position and at a predetermined camera orientation, the captured image resembles the field of view of an inspection system in a manufacturing environment.

Method 800 generates a secondary image from the captured image, the secondary image having a coloration of an inspection type of the inspection system (operation 806). The secondary image is generated by modifying the captured image in any desirable fashion. Method 800 provides the secondary image as training data for an inconsistency identifier program (operation 808). Afterwards, method 800 terminates.

In some illustrative examples, method 800 creates the three-dimensional model based on a layup of a portion of a part to be manufactured (operation 810). In some illustrative examples, plurality of layers in the three-dimensional model represent each of a plurality of layers of the layup of the portion of the part. In these illustrative examples, the three-dimensional model can be a representation of all composite tows in portion 306 of part 308 of FIG. 3. In some illustrative examples, a plurality of layers in the three-dimensional model represent a fraction of the plurality of layers of the layup of the portion of the part. In some illustrative examples, the plurality of layers in the three-dimensional model are selected to create a same curvature as the portion of the part. In some illustrative examples, the plurality of layers in the three-dimensional model are selected such that a surface of the composite layup of the three-dimensional model represents the surface of the portion of the part.

In some illustrative examples, generating the inconsistency comprises moving at least one tow representation in the three-dimensional model (operation 812). In some illustrative examples, moving at least one tow representation in the three-dimensional model generates at least one of overlapping tows, gaps, a missing tow, or other tow position inconsistency.

In some illustrative examples, generating the secondary image comprises applying a number of filters to the captured image to create colorations of an IR image (operation 814). By colorations of the IR image being present, thermal information is present in the secondary image. The addition of thermal information adds context to the images provided to machine learning algorithms. The addition of thermal information using coloration allows for additional inconsistencies to be identified. The addition of thermal information using coloration allows for temperature changes to be identified.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 612 through operation 634 may be optional. As another example, operation 708 through operation 722 may be optional. As yet another example, operation 810 through operation 814 may be optional.

Figure 9:
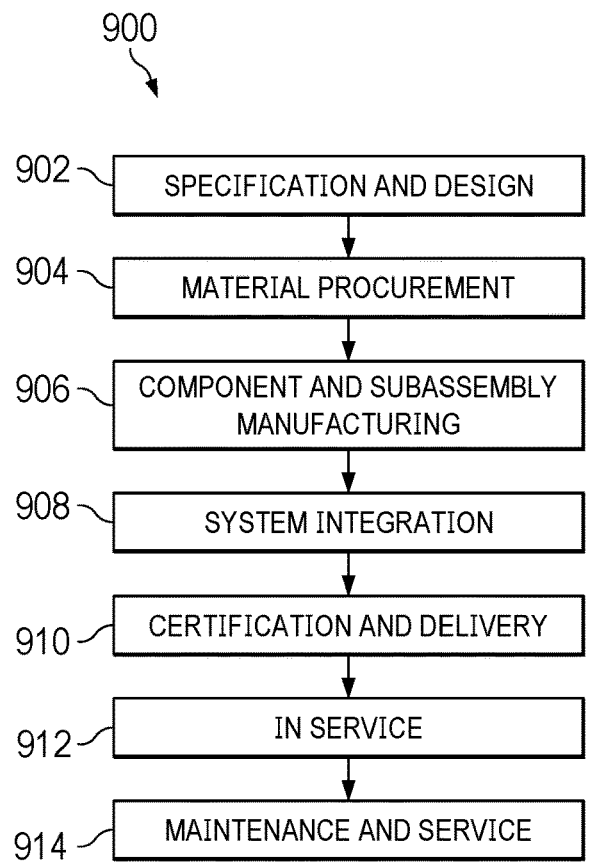
FIG. 9 is an illustration of an aircraft manufacturing and service method in a form of a block diagram in accordance with an illustrative embodiment.
Figure 10:
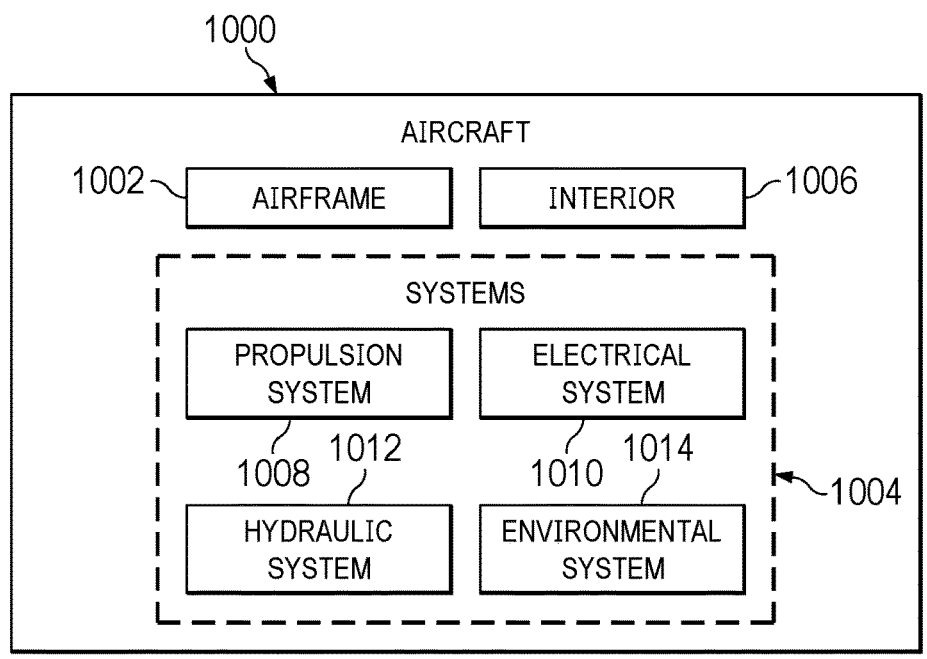
FIG. 10 is an illustration of an aircraft in a form of a block diagram in which an illustrative embodiment may be implemented.

Illustrative embodiments of the present disclosure may be described in the context of aircraft manufacturing and service method 900 as shown in FIG. 9 and aircraft 1000 as shown in FIG. 10. Turning first to FIG. 9, an illustration of an aircraft manufacturing and service method in a form of a block diagram is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 takes place. Thereafter, aircraft 1000 may go through certification and delivery 910 in order to be placed in service 912. While in service 912 by a customer, aircraft 1000 is scheduled for routine maintenance and service 914, which may include modification, reconfiguration, refurbishment, or other maintenance and service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft in a form of a block diagram is depicted in which an illustrative embodiment may be implemented. In this example, aircraft 1000 is produced by aircraft manufacturing and service method 900 of FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included.

Apparatuses and methods embodied herein may be employed during at least one of the stages of aircraft manufacturing and service method 900. One or more illustrative embodiments may be manufactured or used during at least one of component and subassembly manufacturing 906, system integration 908, in service 912, or maintenance and service 914 of FIG. 9.

The illustrative examples provide methods for generating synthetic data for training inconsistency identifiers. In the illustrative examples, synthetic data is generated using views of a three-dimensional model. Synthetic data for a plurality of different inspection types can be generated from the same three-dimensional model. The three-dimensional model can be modified based on design changes to the part.

In some illustrative examples, the synthetic data can be synthetic infrared data. Synthetic infrared data can improve and increase the viability of implementation of IR inspection for AFP monitoring as well as general infrared evaluations.

The addition of thermal data to the synthetic 'contrast only' data provides context for an infrared inspection. In some illustrative examples, synthetic images are constructed with simulations of visual light with thermal data added in post-processing. The addition of thermal data to the synthetic data can be as simple as setting a max and min temperature value to bound the color palette and as complex as adding algorithms to account for the natural dissipation of heat as it flows through a material and is lost through convection/conduction. The addition of thermal data can be accomplished through setting material properties in the three-dimensional model. The addition of thermal data can be accomplished through processing of the captured images to form secondary images.

The illustrative examples provide a virtual representation of the part that takes into account at least one of the part layup, machine, material, and layup path. Virtual representation of the build environment allows for the simulation of multiple part configurations, camera positions, and layup programs/speeds.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of generating synthetic data for composite manufacturing inspection comprising:
creating a three-dimensional model of a composite layup in a three-dimensional model space;
generating an inconsistency in the three-dimensional model of the composite layup;
setting a camera position and a camera orientation in the three-dimensional model space;
generating a captured image of the three-dimensional model and the inconsistency from the camera position and the camera orientation; and
creating a secondary image from the captured image, the secondary image having colorations of a preselected inspection type, wherein creating the secondary image comprises applying a number of filters to the captured image to create the secondary image, wherein applying the number of filters creates the colorations of the preselected inspection type in pixels of the secondary image.

2. The method of claim 1, wherein the inconsistency is one of overlapping tows, gaps between tows, or foreign object debris.

3. The method of claim 1 further comprising:
determining a layup of a portion of a part; and
generating the three-dimensional model of the composite layup using the layup of the portion of the part.

4. The method of claim 3, wherein the layup comprises a plurality of layers of composite material and the three-dimensional model comprises a plurality of layers arranged the same as the plurality of layers of composite material.

5. The method of claim 1, wherein applying the number of filters to the captured image creates colorations of an IR image.

6. The method of claim 1, wherein the inconsistency has an inconsistency type, and wherein applying the number of filters to the captured image creates colorations characteristic of the inconsistency type for the preselected inspection type within pixels of the secondary image with the inconsistency.

7. The method of claim 1, wherein creating the secondary image comprises sampling colors from pixels of the inconsistency in the captured image and adjusting color values for the pixels to values within a range for an inconsistency type of the inconsistency in stock images of the preselected inspection type.

8. The method of claim 1 further comprising:
determining a head orientation of an inspection system attached to a composite laying head in a manufacturing environment, wherein setting the camera position and the camera orientation in the three-dimensional model space comprises setting the camera orientation based on the head orientation.

9. The method of claim 1 further comprising:
supplying the secondary image as training data to an inconsistency identifier program.

10. The method of claim 9 further comprising:
generating inspection images of composite tows after the composite tows are laid; and
evaluating the inspection images using the inconsistency identifier program trained using the secondary images.

11. A method of training a composite inspection system comprising:
generating a captured image of a three-dimensional model of a composite layup with an inconsistency at a predetermined camera position and at a predetermined camera orientation within a three-dimensional model space containing the three-dimensional model;
modifying the captured image to form a secondary image having coloration of a preselected inspection type, wherein modifying the captured image comprises applying a number of filters to the captured image to create the secondary image, wherein applying the number of filters creates the colorations of the preselected inspection type in pixels of the secondary image; and
training an inconsistency identifier program using the secondary image.

12. The method of claim 11 further comprising:
inspecting composite tows as the composite tows are laid down to form inspection images; and
evaluating the inspection images using the inconsistency identifier program trained using the secondary images.

13. The method of claim 12, wherein the composite tows are inspected using an inspection system, and wherein the predetermined camera orientation within the three-dimensional model space is based on a head orientation of the inspection system.

14. The method of claim 12, wherein inspecting the composite tows comprises generating IR images of the composite tows after deposition.

15. The method of claim 11, wherein modifying the captured image comprises sampling colors from pixels of the inconsistency in the captured image and adjusting color values for the pixels to values within a range for an inconsistency type of the inconsistency in images of the preselected inspection type.

16. The method of claim 11 further comprising:
determining a head orientation of an inspection system attached to a composite laying head in a manufacturing environment; and
setting the predetermined camera position and the predetermined camera orientation in the three-dimensional model space based on the head orientation.

17. A method of using synthetically generated training data comprising:
generating an inconsistency in a three-dimensional model comprising a plurality of layers of a composite layup;
generating a captured image of the inconsistency and the three-dimensional model at a predetermined camera position and at a predetermined camera orientation based on a head orientation of an inspection system connected to a composite laying head;
generating a secondary image from the captured image, the secondary image having a coloration of an inspection type of the inspection system, wherein generating the secondary image from the captured image comprises applying a number of filters to the captured image to create the secondary image, wherein applying the number of filters creates the colorations of the inspection type in pixels of the secondary image; and
providing the secondary image as training data for an inconsistency identifier program.

18. The method of claim 17, wherein generating the secondary image comprises applying a number of filters to the captured image to create colorations of an IR image.

19. The method of claim 17 further comprising:
creating the three-dimensional model based on a layup of a portion of a part to be manufactured.

20. The method of claim 17, wherein generating the inconsistency comprises moving at least one tow representation in the three-dimensional model.

21. The method of claim 17, wherein generating a secondary image from the captured image comprises sampling colors from pixels of the inconsistency in the captured image and adjusting color values for the pixels to values within a range for an inconsistency type of the inconsistency in images of the inspection type.

22. The method of claim 17 further comprising:
    generating inspection images of composite tows after the composite tows are laid; and
    evaluating the inspection images using the inconsistency identifier program trained using the secondary images.

* * * * *